March 22, 1949. R. A. SCHAFER ET AL 2,464,996
MACHINE TOOL
Filed Aug. 23, 1946 16 Sheets-Sheet 2

INVENTORS.
Robert A. Schafer
Ralph B. Rodal
By Hinkle, Horton, Ahlberg, Hauswanne & Kupp
Attorneys.

March 22, 1949.  R. A. SCHAFER ET AL  2,464,996
MACHINE TOOL

Filed Aug. 23, 1946  16 Sheets-Sheet 4

INVENTORS.
Robert A. Schafer
Ralph B. Rodal
By
Hinkel, Horton, Ahlberg, Hausmann & Kupper
Attorneys March 22, 1949.　　R. A. SCHAFER ET AL　　2,464,996
MACHINE TOOL Filed Aug. 23, 1946　　16 Sheets-Sheet 8

INVENTORS.
Robert A. Schafer
Ralph B. Rodal
By Hinkle, Horton, Ahlberg, Hanamann & Hupper
Attorneys

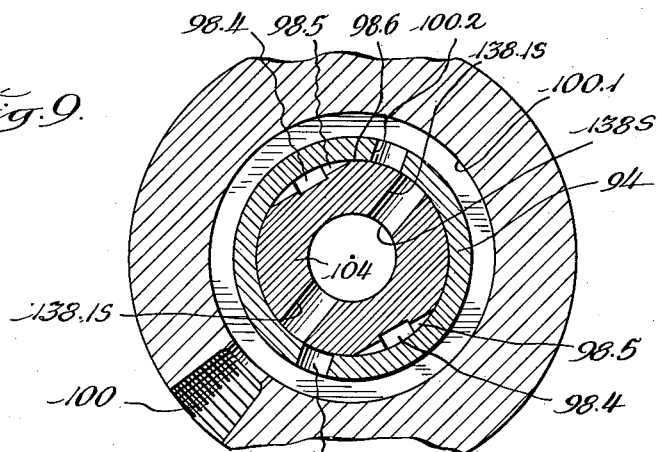
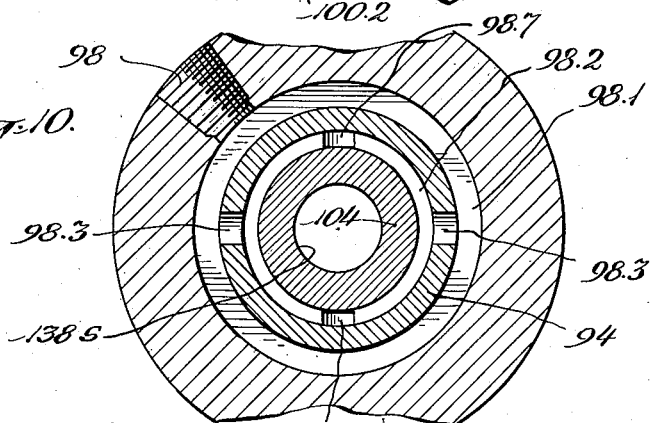
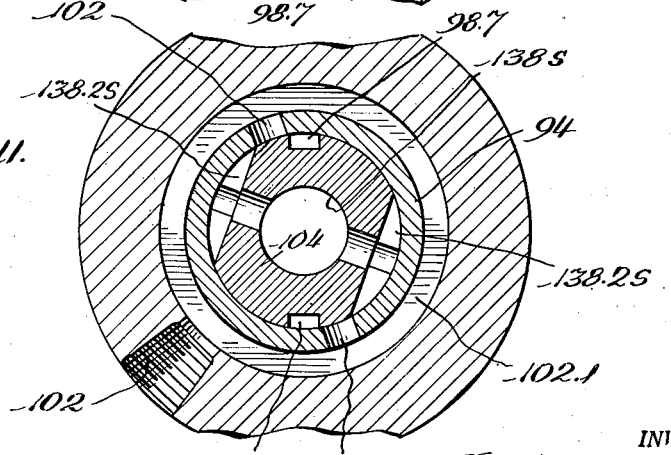

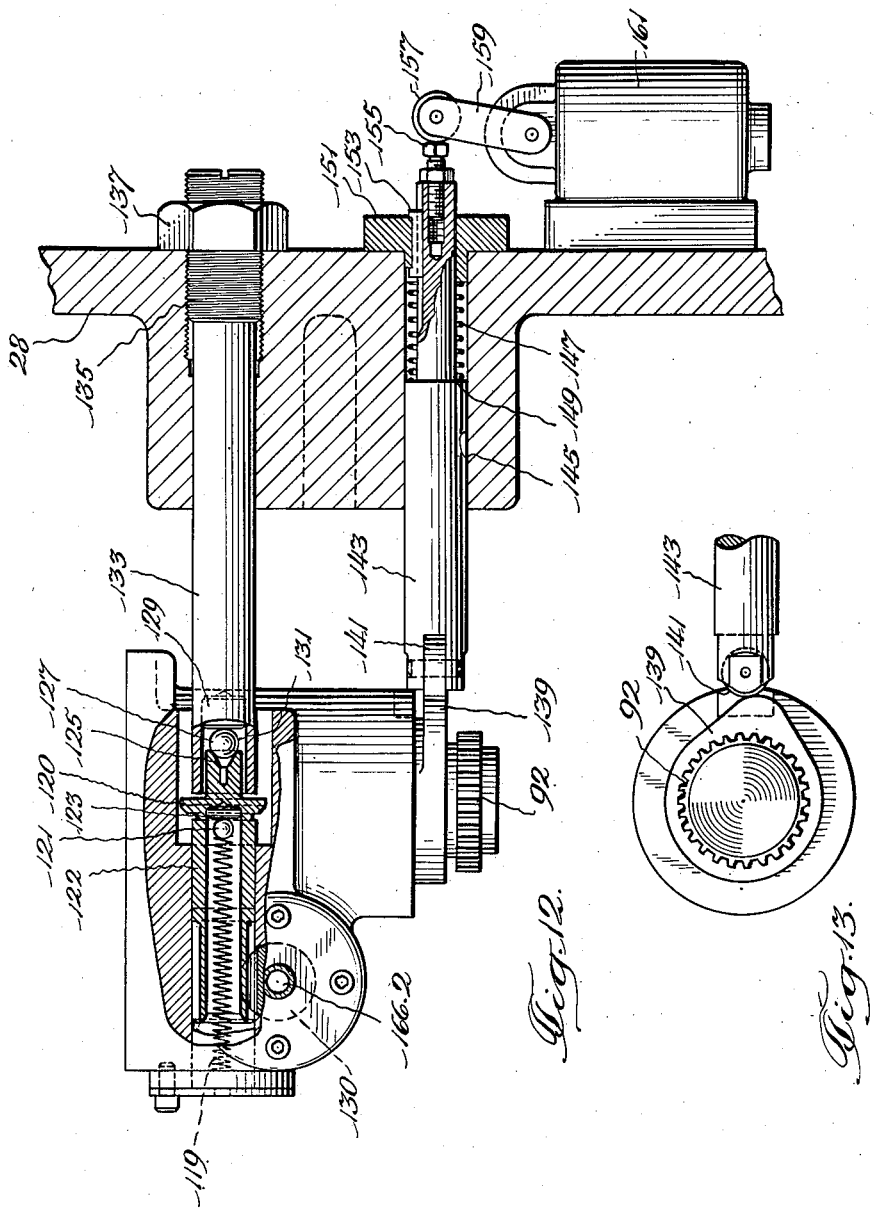

March 22, 1949. R. A. SCHAFER ET AL 2,464,996
MACHINE TOOL
Filed Aug. 23, 1946 16 Sheets-Sheet 11
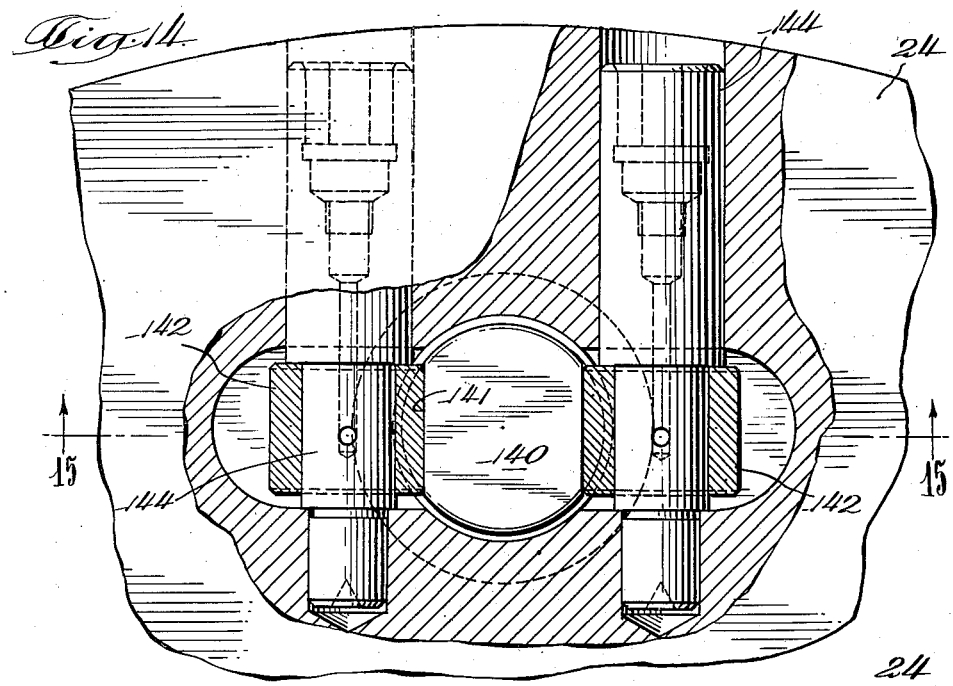
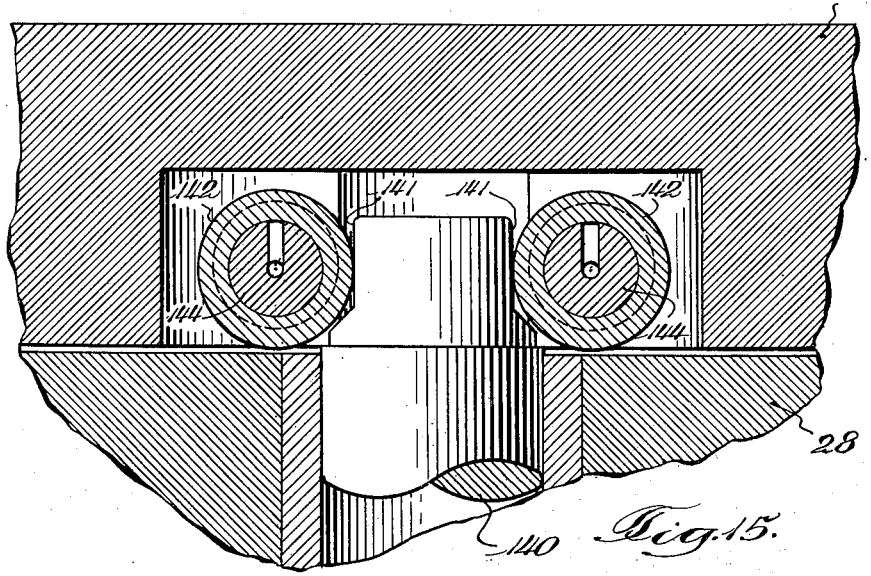
INVENTORS.
Robert A. Schafer
Ralph B. Rodal
By Hinkle, Horton, Ahlberg, Hausmann & Wupper.
attorneys

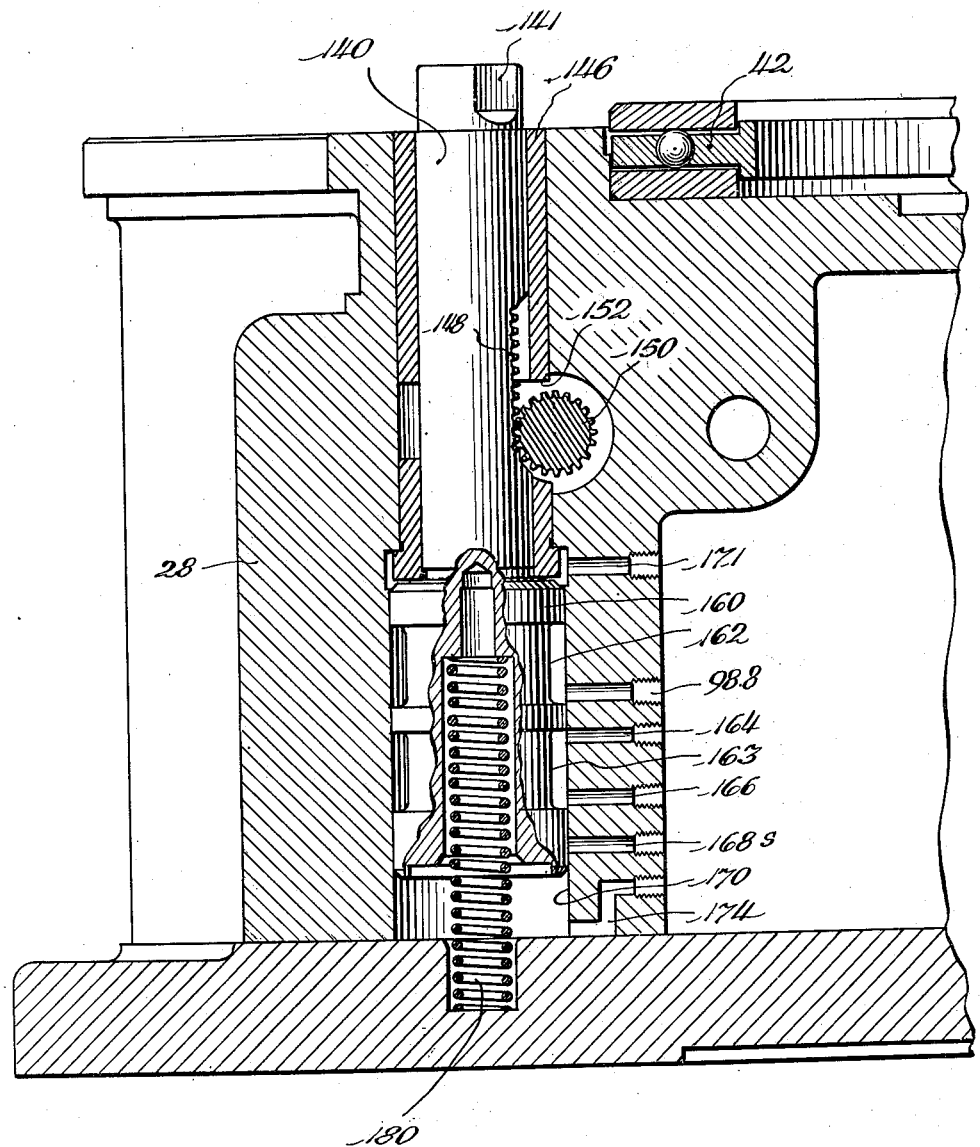

March 22, 1949.  R. A. SCHAFER ET AL  2,464,996
MACHINE TOOL

Filed Aug. 23, 1946  16 Sheets-Sheet 14

INVENTORS.
Robert A. Schafer
Ralph B. Rodal
By Hinkle, Horton, Ehlberg, Hausmann & Kupper
attorneys Patented Mar. 22, 1949

2,464,996

UNITED STATES PATENT OFFICE 2,464,996

MACHINE TOOL

Robert A. Schafer and Ralph B. Rodal, Richmond, Ind., assignors to National Automatic Tool Company, Inc., Richmond, Ind., a corporation of Indiana Application August 23, 1946, Serial No. 692,629

15 Claims. (Cl. 77—64)

Our invention relates generally to machine tools, and more particularly to improved means for indexing work carrying tables forming parts of such machine tools.

In the past, tables of machine tools have been indexed by various mechanisms, such as Geneva motions, hydraulically operated ratchet drives, and direct electric drives. All of these mechanisms possess the disadvantage that due to the inertia of the indexing table, it could be stopped only abruptly with a shock which resulted in extreme wear on the parts, and ultimately led to inaccurate positioning of the table. Furthermore, in constructions in which the indexing table is mechanically stopped at its indexing position, the driving parts, such as gears, racks, etc., must necessarily be made heavy and strong enough to withstand the shock of stopping the table, with the result that these mechanisms became large, heavy, and expensive.

It is therefore the primary object of our invention to provide an improved indexing mechanism for machine tools.

A further object is to provide an improved servo valve mechanism for controlling a hydraulic motor operating to index a workpiece carrying table of a machine tool.

A further object is to provide an improved table indexing mechanism having a control means for automatically operating accurate positioning means after the table has been positioned in substantially the correct position by hydraulic means.

A further object is to provide an improved drive between the hydraulic motor and indexing table, whereby the table may be moved through small angular distances without affecting the hydraulic motor driving train.

A further object is to provide an improved indexing mechanism which may be adapted for indexing tables through practically any desired angle between indexing positions, merely by changing a few gears.

A further object is to provide an indexing mechanism for machine tools, in which substantially the only part having appreciable inertia to be overcome in stopping the indexing table at indexed position is the table itself.

A further object is to provide a simple, compact mechanism for indexing workpiece carrying tables, which is reliable in operation and may be economically manufactured.

Other objects will appear from the following description, reference being had to the accompanying drawings, in which.

Figure 2:
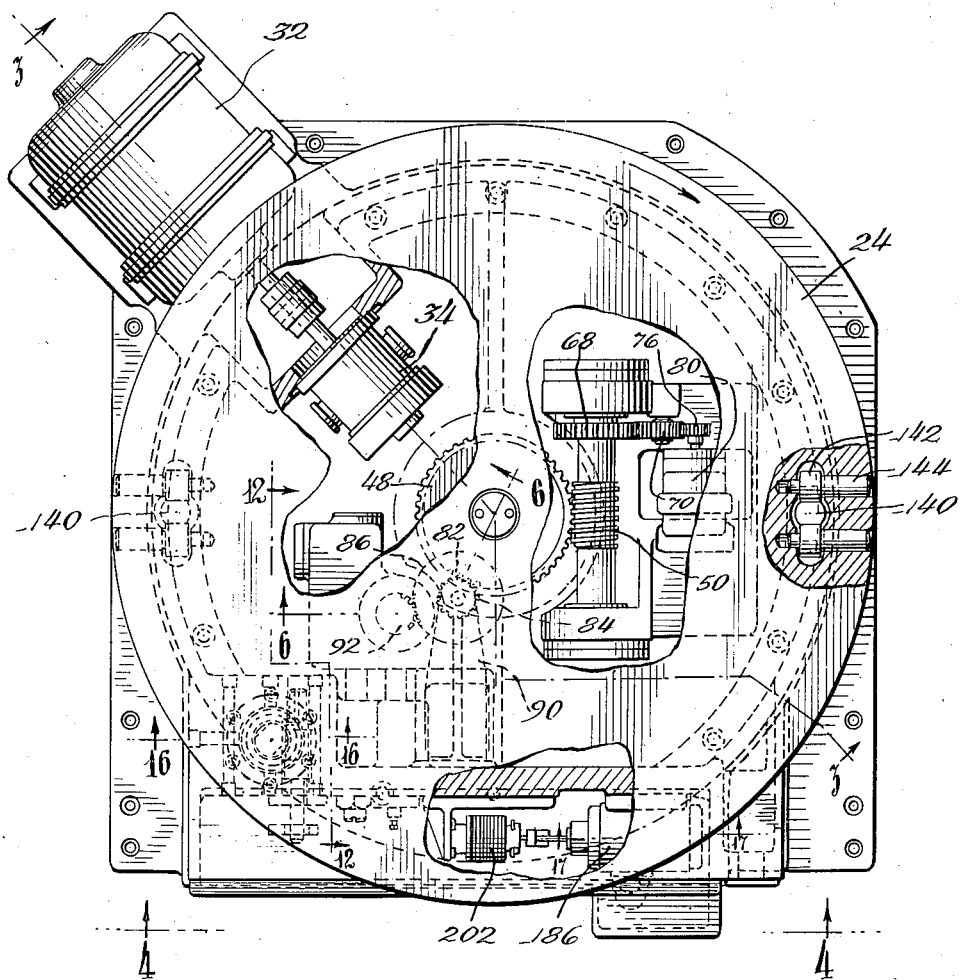
Fig. 2 is a plan view of the indexing table.
Figure 8:
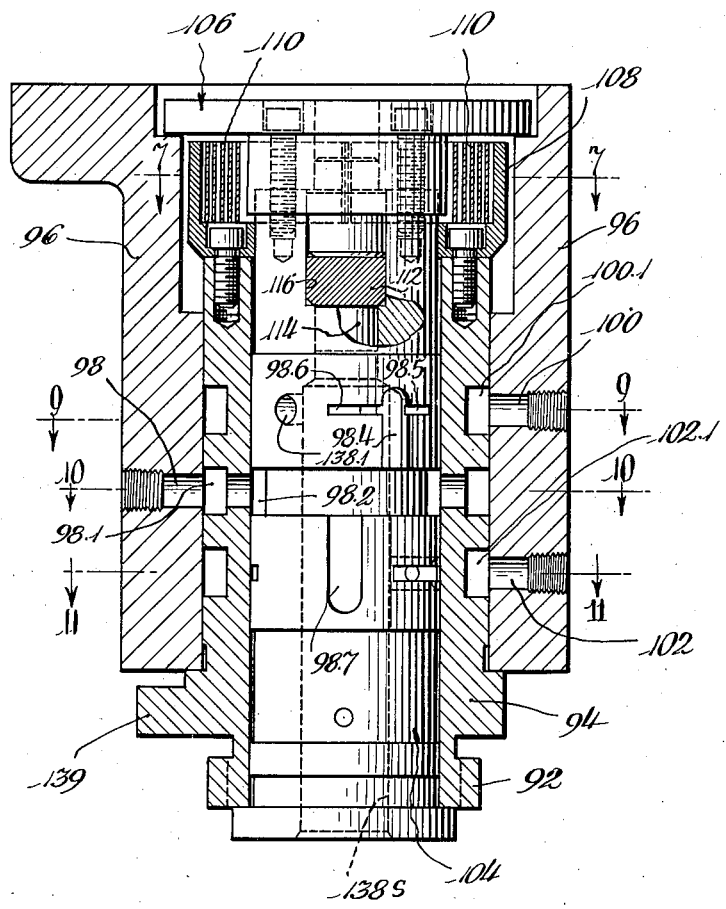
Fig. 8 is a fragmentary sectional view, taken on the line 8—8 of Fig. 7.
Figure 17:
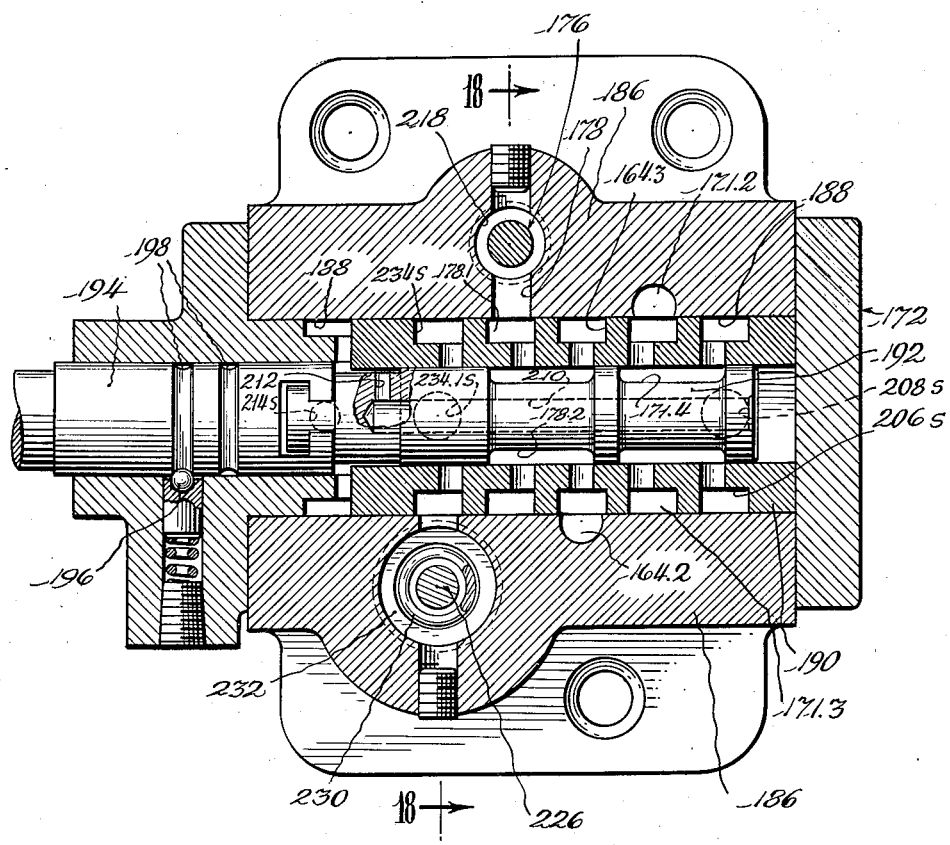
Figure 18:
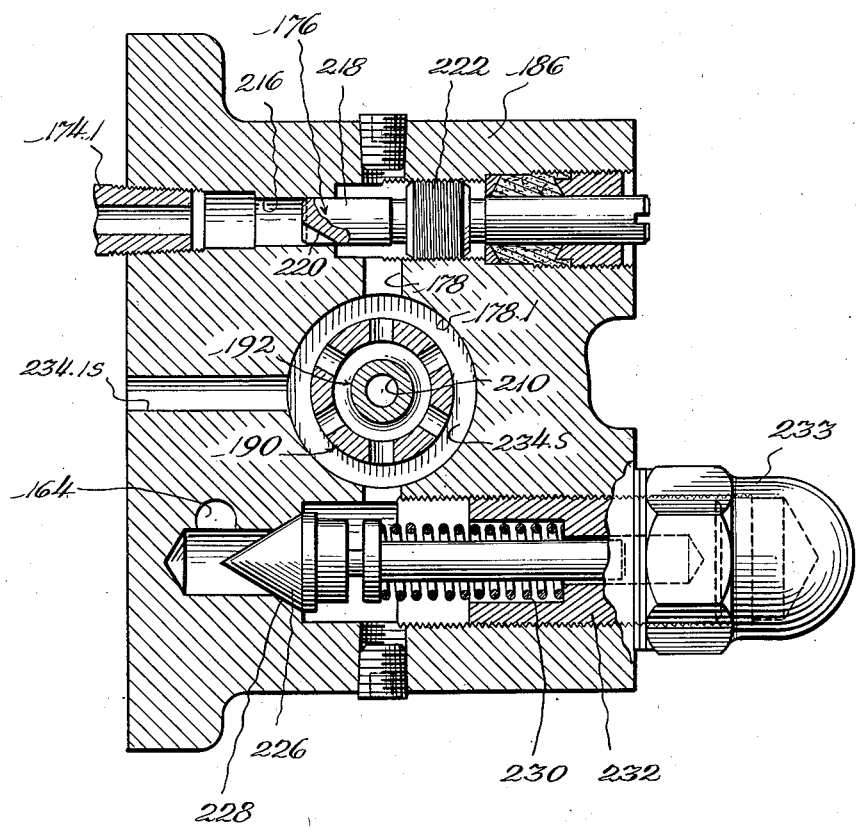
Figure 19:
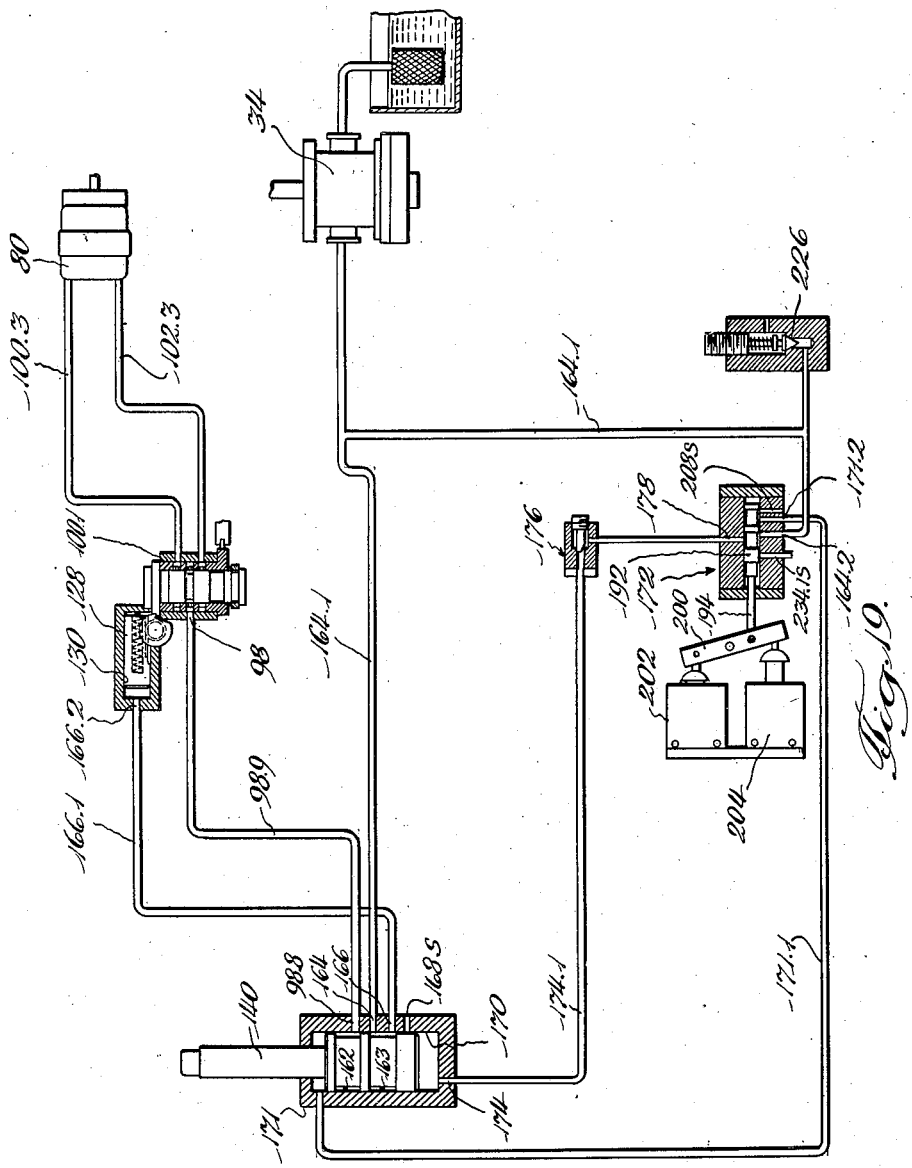
Figure 20:
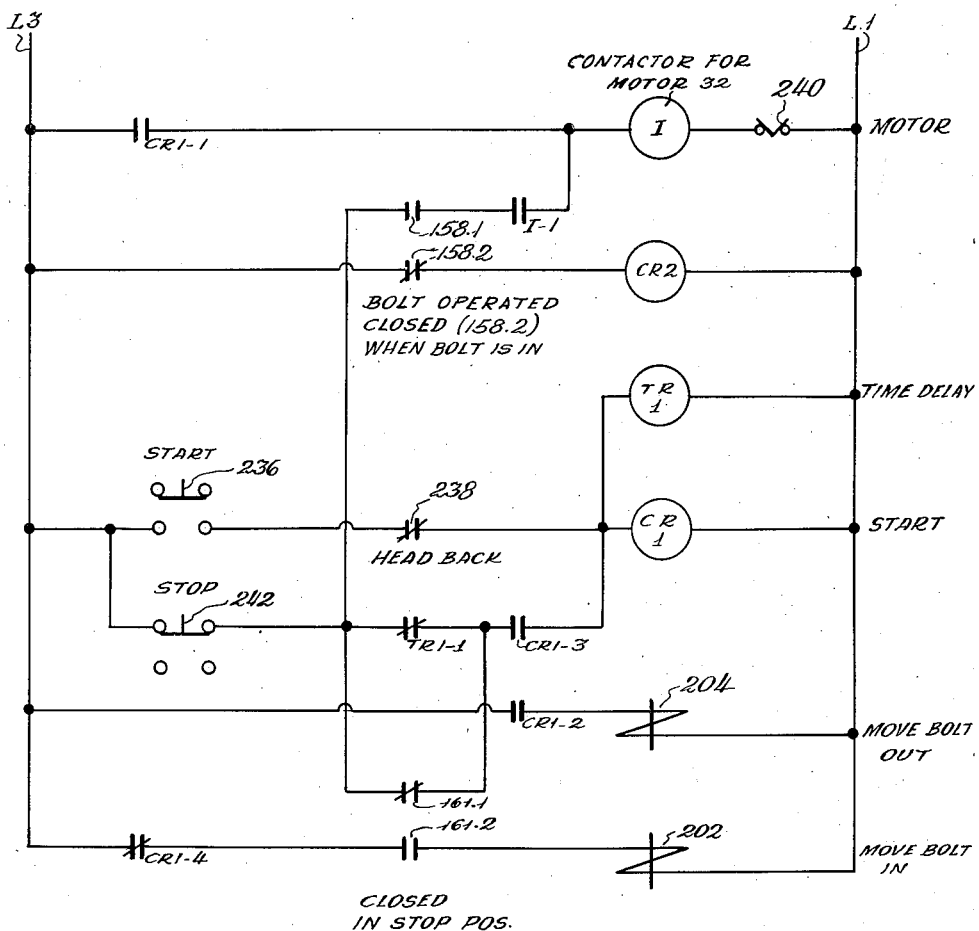

Figs. 9, 10, and 11, are transverse sectional views, taken on the lines 9—9, 10—10, and 11—11, respectively, of Fig. 8;

Fig. 12 is a sectional view, taken substantially on the line 12—12 of Fig. 2;

Fig. 13 is a bottom plan view of the cam and follower shown in Fig. 12;

Fig. 14 is a fragmentary plan view of a portion of the indexing table, with portions thereof in section, showing the adjustable shot bolt locator;

Fig. 15 is a fragmentary sectional view, taken on the line 15—15 of Fig. 14;

Fig. 16 is a fragmentary sectional view of the shot bolt and motor therefor, taken on the line 16—16 of Fig. 2;

Fig. 17 is a fragmentary sectional view of the solenoid operated control valve, taken on the line 17—17 of Fig. 2;

Fig. 18 is a sectional view, taken on the line 18—18 of Fig. 17;

Fig. 19 is a schematic diagram of the hydraulic circuit employed, and illustrates the method of operation; and Fig. 20 is a schematic wiring diagram of the electrical control circuits.

General description

Figure 1:
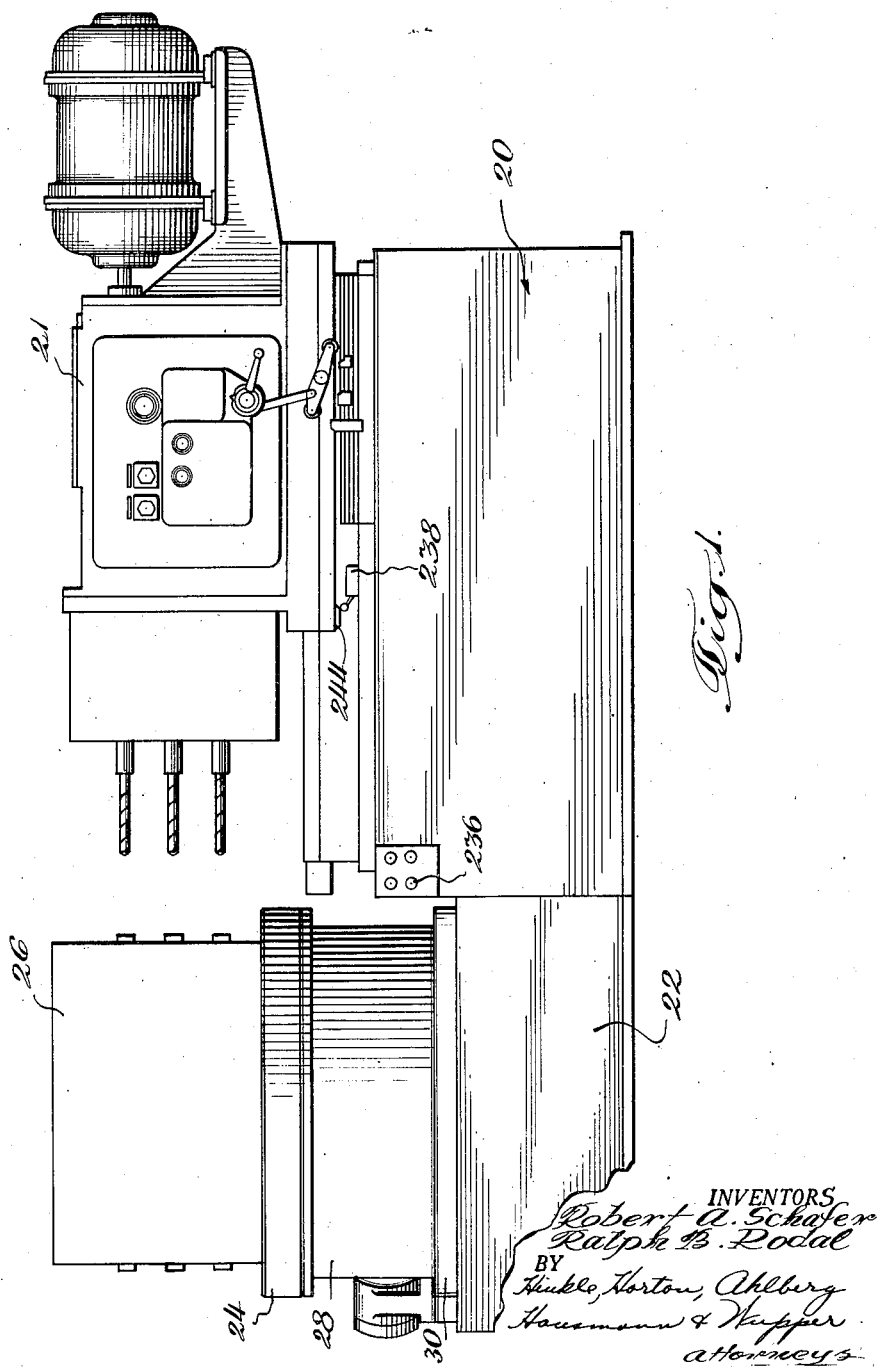
Fig. 1 is a side elevational view of a machine tool embodying the improved indexing table.

In Fig. 1, the indexing table is shown as part of a machine tool 20 which may be of any well known construction, and includes a bed 22 upon which is mounted an indexing table 24 carrying a workpiece 26 which is to have operations performed upon it from diametrically opposite directions or at equally spaced angular intervals.

Figure 3:
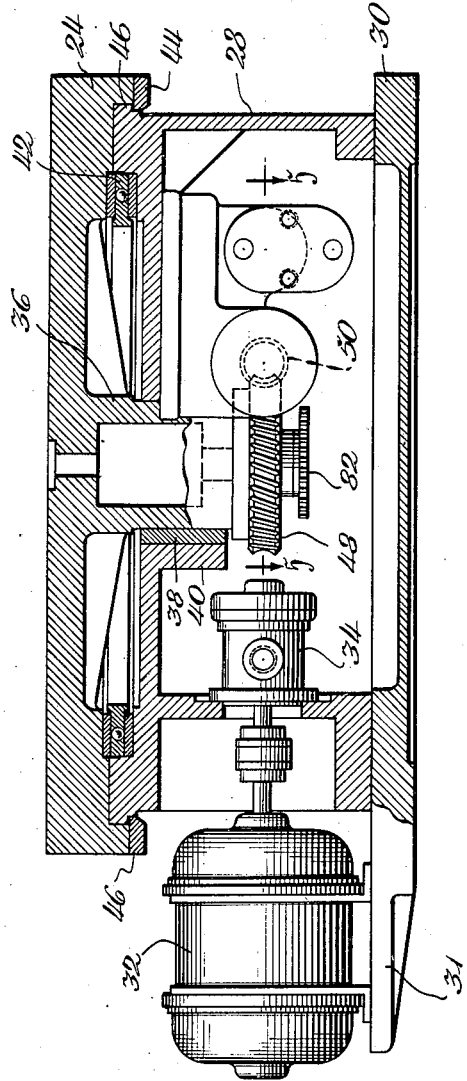
Fig. 3 is a broken sectional view of the table, taken on the line 3—3 of Fig. 2.

The table 24 is mounted for rotation upon a casing 28 (Fig. 3) which is suitably secured to a bed plate 30, the latter being bolted to the bed 22. The bed plate 30 has a projection 31 for mounting an electric motor 32 driving a hydraulic pump 34. The indexing table 24 has a central hub portion 36 which is mounted for rotation in a suitable bearing bushing 38 secured in a depending flange 40 forming part of the casing 28. The weight of the indexing table 24, and that of workpieces and fixtures mounted thereon, is carried by an anti-friction thrust bearing assembly 42 of relatively large diameter, and tilting of the table is prevented by a plurality of shoes 44 secured to the table 24 and engaging beneath a flange 46 formed at the upper edge of the casing 28.

Figure 5:
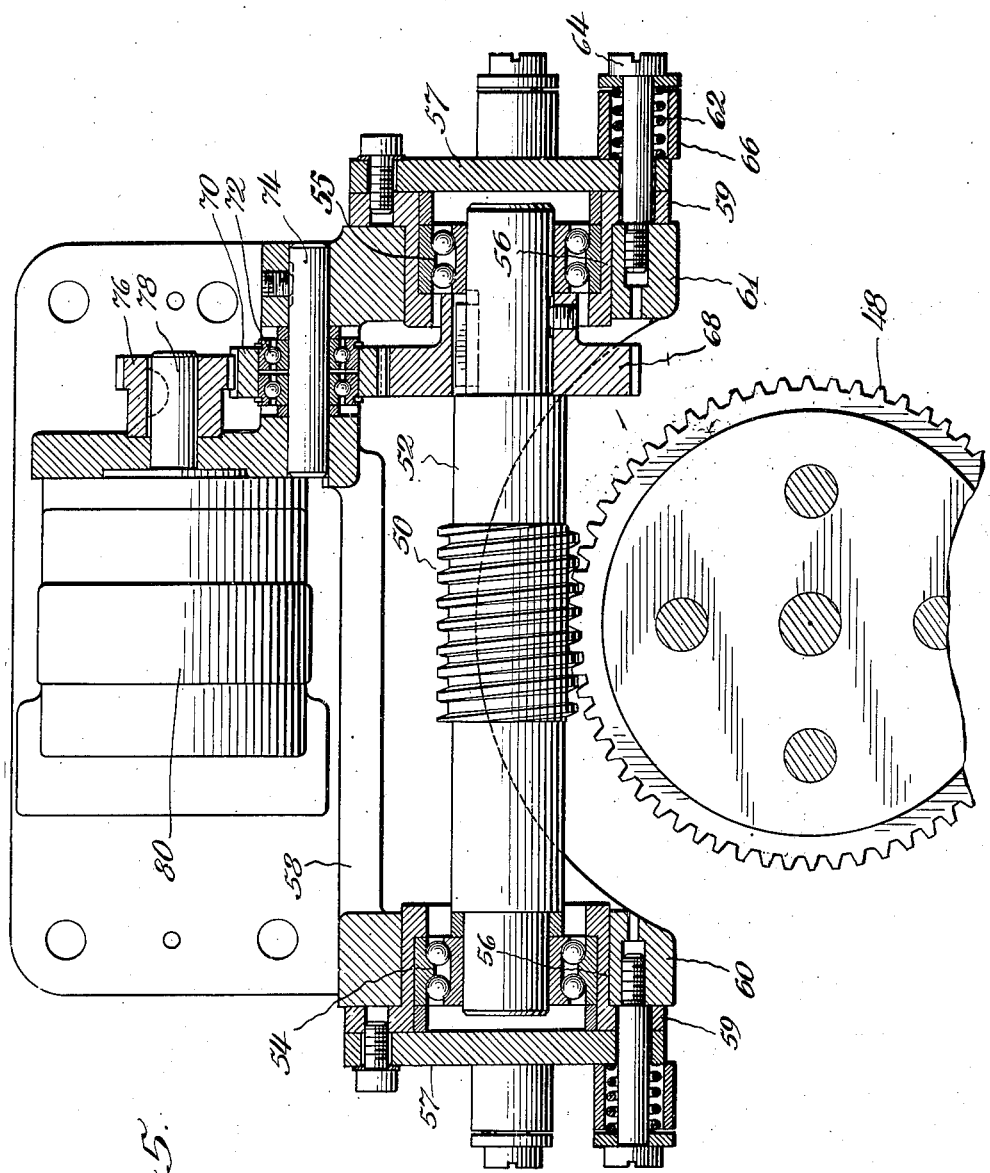
Fig. 5 is a fragmentary sectional view showing the driving mechanism for rotating the indexing table.

A worm gear 48 is secured to the lower end of the hub 36 and has a worm 50 (Fig. 5) meshing therewith. The worm is formed on a shaft 52 rotatable in anti-friction bearing assemblies 54 and 55. The bearing assemblies 54 and 55 are mounted in sleeves 56 which, together with plates 57 bolted thereto form bearing cartridges. These cartridges are mounted for longitudinal sliding movement in a bracket 58 having projecting bearing portions 60 and 61, the bracket 58 being suitably secured to the casing 28. The cartridges 54, 56, 57, and 55, 56, 57, are normally held with their outer flanges 59 in engagement with the ends of the bearing portions 60 and 61, each by a plurality of coil springs 62 which are compressed between the leads of the cap screws 64 and the cover plates 57. A spacing sleeve 66 surrounds each of the coil springs 62 and limits the extent of outward movement of the cartridges 56, 57.

From the foregoing, it will appear that the worm shaft 52 may move longitudinally in either direction from its center position a limited distance, determined by the length of the spacing sleeve 66, against the forces applied by the springs 62.

The shaft 52 has a gear 68 keyed thereto, this gear meshing with an idler pinion 70 secured to the outer races of anti-friction bearings 72 carried by a pin 74. The idler pinion 70 meshes with a driving pinion 76 keyed to the end of the driving shaft 78 of a reversible hydraulic motor 80. The hydraulic motor may be of the gear, piston, vane, or any other suitable type.

*Servo control for indexing motor*

Figure 6:
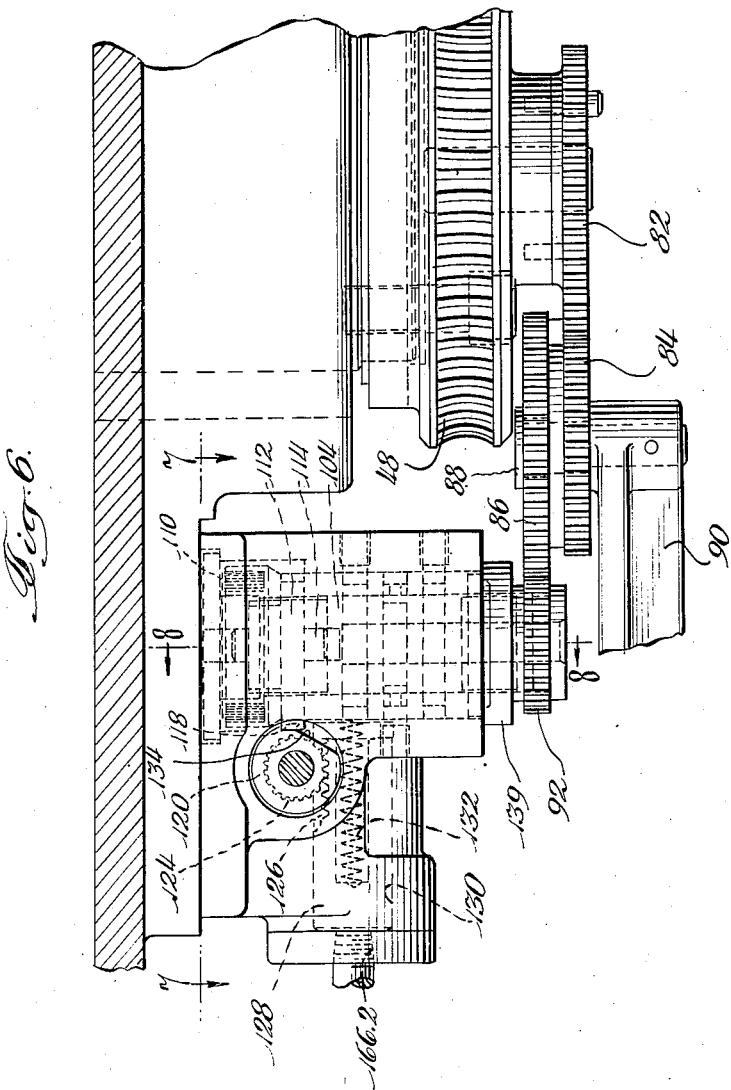
Fig. 6 is a fragmentary sectional view, taken on the line 6—6 of Fig. 2.

The worm gear 48 has a spur gear 82 (Fig. 6) suitably secured thereto, this gear meshing with a pinion 84 which is formed integrally with a gear 86, as a cluster gear. This cluster gear is mounted for free rotation upon a pin 88 carried by a stationary bracket 90. The gear 86 drives a pinion 92 formed on the lower end of a servo valve sleeve 94 (Figs. 6 and 8). The sleeve 94 is mounted for rotation in a servo valve body 96 which is suitably secured to the casing 28.

As shown in Fig. 8, the body 96 is provided with an inlet port 98 and a pair of outlet ports 100 and 102. The sleeve 94 has an annular channel 98.1 which is in communication with the port 98, and similar channels 100.1 and 102.1, respectively, in communication with the ports 100 and 102. A servo valve 104 is fitted in the sleeve 94 for relative rotation, this valve member being rotatably held in the body 96 by a cap piece 106 bolted to the upper end thereof.

Figure 7:
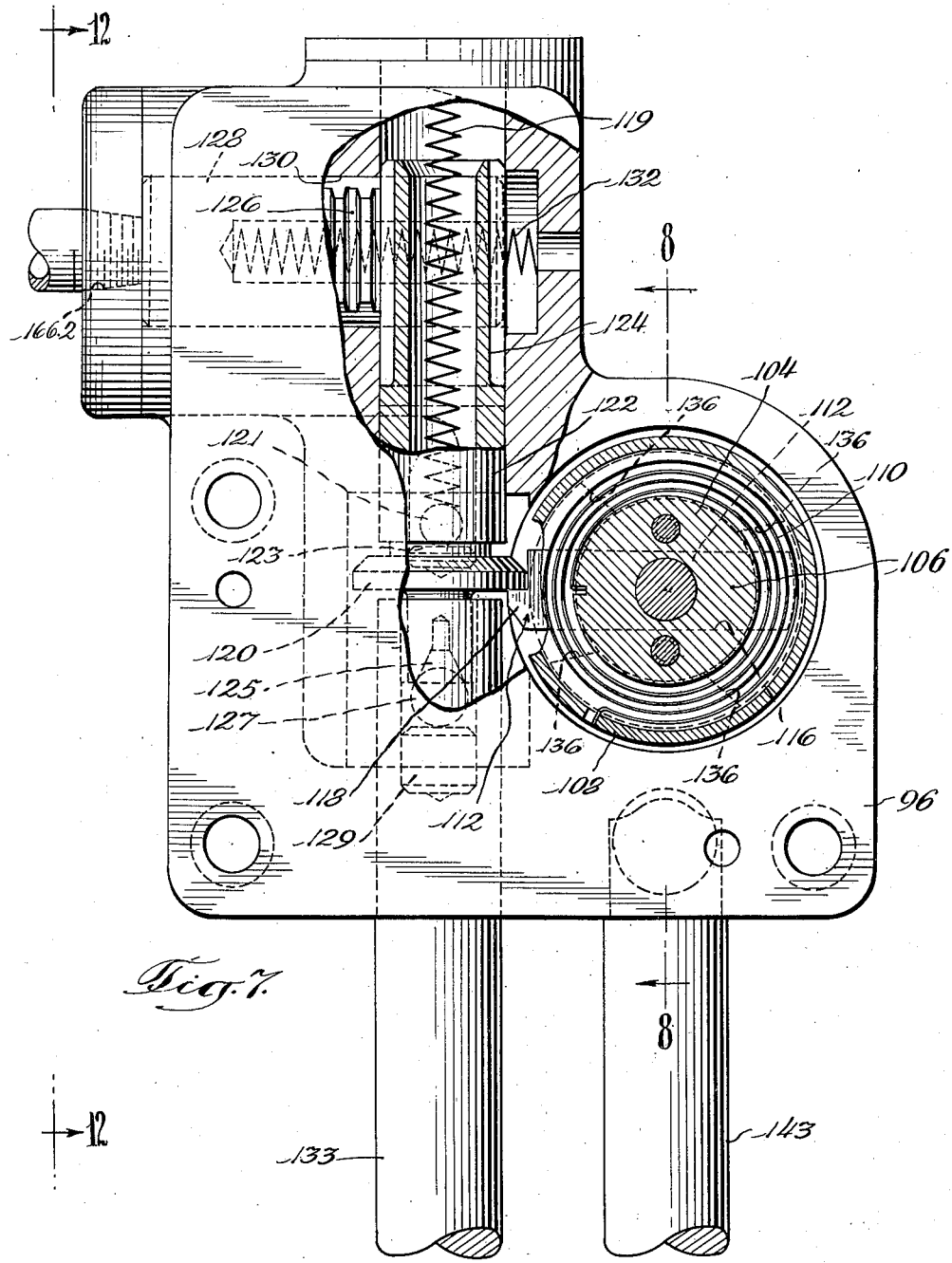
Fig. 7 is a fragmentary plan view, taken on the line 7—7 of Fig. 6.

A spring drum 108 is bolted to the upper end of the sleeve 94 and contains a spiral clock spring 110, the outer end of which is hooked into a suitable slot in the drum 108, while the inner end thereof is hooked into the cap piece 106. A stop bar 112 has a central depending locating projection 114 which fits in a central bore in the valve member 104 and this stop bar projects through a suitable diametral slot 116 formed in the valve member 104, and as shown in Fig. 7, has a notched end 118 adapted to abut against a rotary escapement pawl 120 (Figs. 6 and 7). The pawl 120 is formed integrally with a shaft 122, this shaft having a pinion 124 formed thereon for meshing engagement with a rack 126, the latter forming part of a piston 128 reciprocable in a cylinder 130. The piston 128 is normally held in leftmost position (Fig. 6) by a compressed coil spring 132.

It will be clear from Fig. 6 that when hydraulic fluid under pressure is admitted to the left-hand end of cylinder 130, piston 128 will be moved to the right against the force of the spring 132 and rotate the rotary pawl 120 counterclockwise, thereby permitting the notched end 118 of the stop bar 112 to pass a notch 134 formed in the pawl 120. The spiral clock spring 110 is wound in such direction that the stop bar 112, and hence the valve 104, will be rotated relative to the sleeve 94 in a clockwise direction (Fig. 7), such movement being limited by the engagement of the stop bar 112 with the ends of the slots 136 formed in the sleeve 94.

The valve 104 is provided with a central bore 138S from which oil may discharge freely to the sump or drain. As shown in Fig. 9, the valve 104 has a pair of ports 138.1S which are adapted to cooperate with ports 100.2 communicating with groove 100.1. A pair of slots 138.2S (Fig. 11) communicate freely with the central bore 138S and are adapted to cooperate with ports 102.2 formed in the sleeve 94, the latter communicating with groove 102.1.

As shown in Fig. 10, the valve 104 has an annular groove 98.2 which is at all times in communication with the groove 98.1 through ports 98.3. Extending upwardly from the annular groove 98.2 are a pair of channels 98.4 which terminate in segmental slots 98.5 (Fig. 9). As will be clearly apparent from Fig. 9, the slots 98.5 at their ends which cooperate with the ports 100.2, are of reduced cross sectional area, as indicated at 98.6, so as to cause gradual reduction in the effective area of the slot as it approaches closed position. Also communicating with the annular groove 98.2 are a pair of passageways 98.7 (Figs. 8, 10, and 11) which are adapted to cooperate with the ports 102.2.

The manner of operation of this servo valve will hereinafter be described in detail.

The previously described rotary pawl 120 and its shaft 122 are capable of limited longitudinal sliding movement, as shown in Fig. 12. The pawl and shaft assembly are pressed to the right (Fig. 12) by a compressed coil spring 119 which extends through the hollow shaft 122 and bears against a ball 121 located in the end of the bore in the shaft. A hardened steel bearing plate 123 is located in the end of the bore in the shaft 122 for engagement by the ball 121. The right-hand end of the shaft 122 has a conical recess 125 forming a seat for a ball 127. The ball 127 bears against a hardened steel insert 129 located at the bottom of a suitable bore 131 formed in the end of an adjusting rod 133. The rod 133 has a portion 135 threaded in the casing 28 and is adapted to be locked in adjusted position by a nut 137. By proper adjustment of the rod 133, the position at which the stop bar end 118 of the servo valve 104 engages the stop pawl 120 may be adjusted by a high degree of precision.

The servo valve sleeve 94 has a cam 139 (Figs. 8, 12, and 13) near its lower end for engagement with a follower roller 141 mounted for rotation on a follower rod 143 which is longitudinally slidable in a bore 145 in the casing 28. The follower roller 141 is maintained in contact with the cam 139 by a coil spring 147 which is compressed between a shoulder 149 on the rod and a cap 151. The rod 143 is prevented from rotating by a feather key 153 held in the cap 151. An adjusting screw 155 is threaded in the end of the rod 143 and is adapted to contact a roller 157 mounted on the end of an actuating arm 159 of a limit switch 161.

Shot bolt

When the table is indexed, it is necessary accurately to locate and lock it in the indexed position. This is accomplished by a shot bolt mechanism shown in Figs. 14, 15, and 16, and comprises a shot bolt 140, the upper end of which has flat sides 141 for engagement with locating rolls 142 mounted for free rotation on adjustable pins 144. The portions of the pins 144 which form bearings for the rolls 142 are eccentric, as indicated in Fig. 15, so that by rotation of the pins 144 the spacing between the rolls may be adjusted, or both rolls may be moved in the same direction to make adjustment for the precise position at which the table will be indexed when the shot bolt is forced between the two rolls. The pins 144 are provided with hexagonal sockets for the reception of an Allen wrench, and are provided with suitable means for locking the pins in adjusted position. This type of shot bolt and socket means is more fully disclosed in the copending application of Earl E. Opel, Serial No. 616,275, filed September 14, 1945.

As shown in Fig. 2, there are two sockets for the reception of the shot bolt 140, the table illustrated being designed for two index positions. It will be clear, however, that any desired number of equally angularly spaced shot bolt receiving sockets may be provided to adapt the table for the number of operating stations which may be required.

The shot bolt 140 is slidably mounted in a bearing bushing 146 (Fig. 16) secured in the casing 28, and is provided with a central rack portion 148 meshing with a pinion 150, this pinion projecting through a suitable slot 152 formed in the bushing 146, being formed on a shaft 154 (Fig. 4), and having an arm 156 adjustably clamped thereto, this arm being provided for the operation of a limit switch 158.

As best shown in Fig. 16, the lower end of the shot bolt is of enlarged diameter to form a piston valve 160. This valve has a pair of annular grooves 162, 163, for cooperation with ports 98.8, 164, 166, and 168.

As shown in Fig. 19, the port 98.8 communicates through a conduit 98.9 with the port 98 of the servo valve body, while the port 164 communicates by way of conduit 164.1 with the pump 34. The port 166 is connected by conduit 166.1 with an inlet port 166.2 at the end of cylinder 130 (Fig. 6). The port 168S leads to the sump or drain.

The upper end of the cylinder 170 in which the piston valve 160 of the shot bolt is reciprocable, is connected by port 171 and conduit 171.1 with a port 171.2 (Fig. 17) of a four-way control valve 172. The lower end of the cylinder 170 is connected by passageway 174 and conduit 174.1, to flow restricting valve 176 (Fig. 18). The flow restriction valve 176 connects with a passageway 178 (Figs. 17 and 18) on the four-way control valve 172. The shot bolt 140 is biased in its upper position, in which it locks the table in indexed position by a compressed coil spring 180 (Fig. 16).

Four-way control valve

Figure 4:
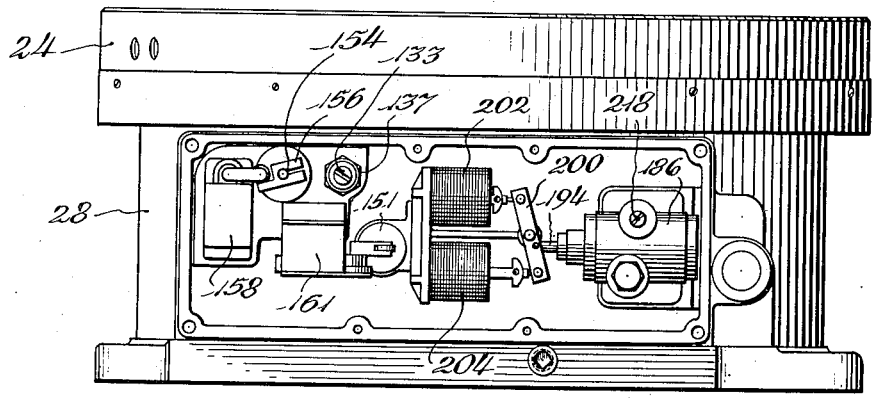
Fig. 4 is an end elevational view, looking in the direction of line 4—4 of Fig. 2, with a cover plate removed to show the solenoid operated valve mechanism.

The four-way control valve, best shown in Figs. 17 and 18, comprises a body 186 having a bore 188 for the reception of a valve sleeve 190. A two-position valve 192 is reciprocable in the sleeve 190 and has a T-slot connection with an actuating rod 194. The valve 192 is adapted to be held in either of its two positions of adjustment by a spring pressed ball detent 196 engageable with either of two grooves 198 formed in the actuating rod 194. As shown in Fig. 4, the actuating rod 194 is pivotally connected to a centrally pivoted lever 200. A pair of solenoids 202 and 204 have their plungers pivotally connected to the ends of the lever 200 for swinging the latter about its central pivot and thereby positioning the rod 194 and valve 192.

The pump 34 is connected to a passageway 164.2 (Fig. 17) formed in the valve body 186 through the conduit 164.1 (Fig 19). The passageway 164.2 communicates with an annular groove 164.3 formed in the sleeve 190. The passageway 171.2 similarly communicates with a groove 171.3 in the sleeve 190. An annular groove 206S is vented to the sump through a passageway 208S.

The valve 192 has a central bore 210 which communicates through a radial passageway 212 with the left-hand end of the bore 188, and the latter is vented to the sump through a passageway 214S.

The flow restriction 176 comprises a cylinder 216 (Fig. 18) in which a plug portion 218 is rotatable and slidable, the end of the portion 218 having a slot 220 formed therein. The plug 218 has an enlarged portion 222 threaded in the body 186 so as to move the plug portion back and forth to adjust for the effective size of the port formed by the slot 220. The oil metered through the slot 220 flows by a passageway 178 to an annular groove 178.1 formed in the sleeve 190.

A pressure relief valve 226 (Fig. 18) is pressed against its seat 228 by a coil spring 230, the degree of compression of which may be adjusted by rotation of a threaded plug 232 which is locked in adjusted position by an acorn nut 233. The space behind the relief valve 226 communicates with annular groove 234S and the latter is vented to the sump through a passageway 234.1S.

The valve 192 has an annular groove 171.4 which, in the position shown, connects ports leading to the annular grooves 171.3 and 206S, while in its other position it connects the groove 171.3 with the groove 164.3. A second annular groove 178.2 connects the groove 178.1 with the groove 164.3 when the valve is in the position shown, and when in its other position, connects grooves 178.1 and 234S.

Control circuits

Referring to Fig. 20, the control circuits are connected across lines L3 and L1. To initiate operation of the indexing table, a start push button 236 is depressed, thus completing a circuit from L1 through switch 236, a limit switch 238 (which is closed when the tool carrying head 21 is in back position, that is, the tool is withdrawn from the workpiece), and a pair of relay windings TR1 and CR1 in parallel. Energization of CR1 results in closure of switch CRI—I, and completes a circuit from line 3 through CRI—I, a contactor I for starting pump motor 32, and an overload relay 240 to LI.

Energization of CRI also results in closure of its contacts CRI—2, thereby completing a circuit through the solenoid 204 and thus shifting the valve 192 to a position such that the oil under pressure may be supplied to the upper end of the shot bolt cylinder 170, as will be pointed out hereinafter.

Therefore, the shot bolt is withdrawn from its socket in the index table, and in doing so, through its rack 48 and pinion 150 operates limit switch 158. Such operation of the limit switch 158 closes its contacts 158.1 and opens its contacts 158.2. Closure of the contacts 158.1 completes a holding circuit through the contactor I for motor 32, this circuit being traced as follows: from line L3, push button operated stop switch 242, contactor 158.1, contactor I—I (closed upon energization of contactor I), contactor I, and overload relay 240 to LI.

The opening of switch 158.2 deenergizes relay CR2, which relay is associated with the electrical control of the head 21 and is so arranged in such control circuit that the head cannot be moved while CR2 is deenergized.

A predetermined time after the start push button 236 is depressed, the time delay relay TRI operates to open its contacts TRI—I. This time delay is sufficient to permit the shot bolt to be retracted and to permit the table to commence its indexing operation. Opening the contacts TRI—I does not result in deenergization of CRI and TRI, since the cam 139 on the servo valve sleeve has by this time moved sufficiently to permit operation of the limit switch 161, resulting in closure of its contacts 161.1, which are in parallel with contacts TRI—I. Since contacts CRI—3 are closed, a circuit is maintained for the energization of CRI and TRI, as follows: from L3, push button switch 242, contactors 161.1 and CRI—3, through CRI and TRI to LI.

As long as CRI is energized, its contacts CRI—4 remain open, and therefore solenoid 202 cannot be energized. When the table has been indexed substantially to its new position, the cam 139 on the servo valve sleeve operates the limit switch 161 to open its contacts 161.1 and to close its contacts 161.2. Since the holding circuit for CRI and TRI was through contacts 161.1, these relays are deenergized and contacts CRI—I, CRI—2, CRI—3, and TRI—I are opened, and contacts CRI—4 are closed. Opening contacts CRI—I has no effect, since the motor contactor I is maintained energized through the holding circuit previously described. Opening of contacts CRI—2 results in deenergization of the solenoid 204. Opening contacts CRI—3 keeps open the circuit to CRI and TRI, and prevents reenergization of these relays upon the closure of contacts TRI—I. Closure of contacts CRI—4 and 161.2, results in energization of solenoid 202. Energization of this solenoid shifts valve 192 to a position such that the hydraulic fluid under pressure is supplied to the lower end of shot bolt cylinder 170, and the latter is thus forced upwardly into its socket. When the shot bolt approaches its uppermost position, it operates limit switch 158 to open its contacts 158.1 and close its contacts 158.2.

Opening the contacts 158.1 results in deenergization of the contactor I for the motor 32, while closure of contacts 158.2 results in energization of CR2. As previously stated, relay CR2 operates contacts in the electrical control circuits for the head 21, enabling the head 21 to commence an operating cycle. In some instances, energization of CR2 will initiate an operating cycle of the head 21. When the head advances at the beginning of an operating cycle, a cam or dog 244 (Fig. 1) secured to the head 21 moves away from the actuator of a limit switch 238, so that this switch opens, thus providing an interlock to prevent restarting of the table indexing mechanism while the head 21 is displaced from its normal position. After completion of the operating cycle of the head 21, when it has returned to normal position, the dog 244 operates to close switch 238, thereby reconditioning the control circuits of the indexing mechanism for restarting.

The indexing operation may be stopped at any time by operation of the stop push button 242. This opens the holding circuit for the contactor I of the pump motor and thus the hydraulic pressure in the system is rapidly dissipated. At other times the depression of the stop push button 242 deenergizes contactor I through deenergization of CRI.

*Operation of hydraulic circuits*

The operation of the hydraulic circuits will now be described in detail.

Upon starting the indexing mechanism by depression of the start push button 236, it will be recalled that the pump 34 is started to provide oil under pressure for operation of the hydraulic system; also that the solenoid 204 was energized.

The oil under pressure is therefore supplied through conduit 164.1 (Fig. 19) to passageway 164.2 (Fig. 17), and the groove 164.3. Since the solenoid 204 is energized at this time, the valve 192 (Fig. 17) is in its leftmost position, and thus the annular passageway 171.4 of this valve connects groove 164.2 to groove 171.3, and thus oil under pressure may flow through the passageway 171.2 and conduit 171.1 to the upper end of shot bolt cylinder 170 to force the shot bolt 140 downwardly.

If perchance the rotary pawl operating piston 128 has not moved to the right (Fig. 6) to release the stop 118 upon initial starting of the motor 34, oil under pressure is supplied through conduit 164.1 to port 164, annular groove 163 in the shot bolt, and port 166, through conduit 166.1 and inlet 166.2 to the left-hand (Fig. 6) end of cylinder 130. When the rotary pawl 120 is thus moved from the position in which it arrests the stop bar 118, the spiral clock spring 110 rotates the servo valve 104 clockwise (Fig. 7). The valve 192, in its leftmost position, permits escape of oil from the lower end of the shot bolt cylinder 170 through port 174, conduit 174.1, flow restriction 176, port 178, to annular groove 178.1. The oil may flow from this groove through the space provided by groove 178.2 and through groove 234S and port 234.1S to the sump.

As the shot bolt completes its downward stroke, the connection between conduit 164.1 and 166.1 is broken, and instead, the conduit 164.1 is connected through groove 162 of the shot bolt to conduit 98.9, thus supplying the oil under pressure to the servo valve inlet 98. When the shot bolt reaches its lower position, it also connects conduit 166.1 to the sump or drain opening 168S.

It will be recalled that due to the operation of the rotary pawl, the servo valve 104 was rotated clockwise by the spring 110 (Figs. 7, 9, 10, and 11) from the position in which it is shown in these figures, through an angle of approximately 45°, being arrested in this position by the engagement of the stop bar 112 with the ends of slots 136, thereby bringing the slots 98.5 into registry with the ports 100.2. The oil under pressure may therefore flow through groove 100.1 and conduit 100.3, to hydraulic motor 80, rotating the latter in a direction such that the indexing table moves clockwise (Fig. 2). The rotation of the table, through the gear train 82, 84, 86, and 92, rotates the servo valve sleeve 94 clockwise through an angle of 315°, and during this 315° rotation, the servo valve 104 will rotate with the sleeve due to the driving connection provided by the spiral spring 110.

Under these conditions, when the servo valve 104 and its sleeve 94 are thus positioned, the motor 80 operates at full speed, and when the 315° rotation above referred to is completed, the valve 104 is arrested by engagement of the end portion 118 of the stop bar 112 with the rotary pawl 120. Thereafter the sleeve continues rotation through an additional 45°, while the valve 104 is stationary. Such relative movement causes the ports 100.2 to pass by the slots 98.5. Toward the end of such movement, the flow through the slots 98.5 is gradually reduced due to the provision of the tapering slots 98.6, and thus the speed of operation of the motor is correspondingly reduced so as gradually to decelerate the table as it approaches its indexed position. The table therefore comes to rest gradually without shock.

If for some reason the table should overtravel its index position, the ports 100.2 will come into registry with the ports 138.1S, thus venting the conduit 100.3 to the sump and at the same time ports 102.2 will come into registry with channels 98.7 and oil under pressure will therefore be supplied from the groove 98.1 to the conduit 102.3, causing reversal of the direction of operation of the hydraulic motor 80. Such reversal will continue until the turntable is returned to its proper index position.

As the table approaches its index position, the cam 139 on the servo valve sleeve 94 operates limit switch 161 which, it will be recalled from the description of the circuit diagram of Fig. 20, results in deenergization of solenoid 204 and energization of solenoid 202. Energization of solenoid 202 shifts the valve 192 to its rightmost position, the position in which it is shown in Fig. 17, and as a result, oil under pressure supplied through passageway 164.4 flows through the groove 178.2, past the flow restriction 176 and through conduit 174.1 and port 174 into the lower end of shot bolt cylinder 170. The shot bolt therefore commences moving upwardly, the oil from the upper end of the cylinder 170 being discharged through port 171, conduit 171.1, passageway 171.2, groove 171.3, and space provided by the groove 171.4 to the groove 206S, from which the oil may flow freely to the sump through passageway 208S.

As the shot bolt moves upwardly, it operates limit switch 158 through the rack and pinion 148, 150, closing limit switch contacts 158.2, and opening its contacts 158.1, the opening of the latter contacts deenergizing contactor I and thus stopping the pump motor 32. Closure of its contacts 158.2 results in energization of CR2, thereby conditioning the control circuits of the head for operation, or actually initiating such operation.

As the shot bolt 140 reaches its upper position, the oil under pressure in the conduit 164.1 is connected by way of the groove 163 around the shot bolt, with conduit 166.1, thereby supplying oil under pressure to the cylinder 130 to move the piston 128 to the right (Fig. 6), and thus rotating the rotary pawl 120 to a position releasing the stop bar 112. This permits the clock spring 110 to rotate the servo valve 104 clockwise through approximately 45°. This may occur just prior to the stopping of the pump 34.

While the flow restriction 176 is useful in some instances to prevent too rapid upward movement of the shot bolt, and thereby prevent the shot bolt from moving the table too rapidly to its index position, it has been found that the flow restriction may be omitted in many machines without undue shock as the shot bolt accurately moves the table to its index position and stops it in such position.

When it is desired to construct the table for indexing to more than two positions, it is necessary merely to provide additional appropriately located sockets for the reception of the shot bolt and to increase the reduction provided by the gear train 82, 84, 86, 92, proportionately. The operation of the apparatus will not differ from that above described, except that the table will be indexed through the lesser angle determined by the gear ratio between the table and the servo valve sleeve, and by the location of the socket structures for the shot bolt.

It will be clear that the table indexing mechanism may be employed as a part of a fully automatic machine. In such machines the start push button switch 236 is replaced by a relay or limit switch which is operated upon the completion of one cycle of operation of the machine, so as to initiate a table indexing cycle at the end of each machine cycle. In such machines, the relay CR2 would be arranged to initiate operation of the machine tool cycle upon the completion of the indexing of the table, as described herein.

From the foregoing description, it will appear that by the use of a servo valve controlled hydraulic motor, the table may be rapidly indexed to the desired position without shock, due to the attenuating effect of the slots 98.6 in the servo valve (Fig. 9), and that the table may be angularly positioned in its indexed position with a high degree of precision due to the operation of the shot bolt in engaging the accurately adjusted rollers 142 (Fig. 15). Any slight movement of the table required as the shot bolt 140 engages the rollers 142, is permitted due to the resilient mounting of the worm 50 shown in Fig. 5.

The servo valve operates very effectively to control the flow of hydraulic power fluid to the hydraulic motor which indexes the table, since it rotates through 360° during each indexing cycle. The control of the servo valve is facilitated by the fact that it is provided with a latch to hold it stationary, and with hydraulically operated means to release the latch.

The construction and operation of the indexing mechanism is further simplified and its cost reduced by having the shot bolt hydraulically operated and utilizing the piston thereof as a valve means to control the release of the servo valve latch.

By virtue of the fact that the servo valve latch may have its position adjusted with a high degree of precision, the position in which the index table will come to rest is determined very accurately.

While we have shown and described a preferred embodiment of our invention, it will be apparent that numerous variations and modifications thereof may be made without departing from the underlying principles of the invention. We therefore desire, by the following claims, to include within the scope of the invention, all such variations and modifications by which substantially the results of our invention may be obtained through the use of substantially the same or equivalent means.

We claim:

1. In a machine tool having a workpiece carrying table mounted for rotation in predetermined angular steps, means to index said table and lock it in indexed position comprising, a reversible hydraulic motor, gearing including a worm and worm gear connected between the hydraulic motor and the table for driving the latter, resilient means holding the worm in a central driving position but permitting limited longitudinal movement of the worm, a servo valve controlling the supply of hydraulic fluid under pressure to the reversible hydraulic motor, a latch to hold the servo valve from operation, a shot bolt for locking the table in indexed position, hydraulically operated means for moving the shot bolt into and out of locking engagement with the table, and means controlled by the shot bolt and operative when it is withdrawn from engagement with the table to effect the release of the latch, thereby to permit operation of the servo valve to direct flow of hydraulic fluid under pressure to the hydraulic motor.

2. Apparatus for indexing a rotary table forming part of a machine tool comprising, means for locking the table in any of a plurality of angularly displaced positions, a hydraulic motor, a yielding driving connection between the hydraulic motor and the table, a servo valve having two relatively movable parts for controlling the operation of the hydraulic motor, resilient means biased to rotate said parts relative to one another, a non-yielding driving connection between the table and one of said parts, a latch normally holding the other of the servo valve parts, and means controlled by the table locking means when in table releasing position to cause said latch to be moved to release the servo valve part.

3. Apparatus for indexing a rotary table forming part of a machine tool comprising, hydraulically operated means for locking the table in any of a plurality of angularly displaced positions, a hydraulic motor, a yielding driving connection between the hydraulic motor and the table, a servo valve having two relatively movable parts for controlling the operation of the hydraulic motor, resilient means biased to rotate said parts relative to one another, a non-yielding driving connection between the table and one of said parts, a latch normally holding the other of the servo valve parts, means controlled by the table locking means when in table releasing position to cause said latch to be moved to release the servo valve part, and electromagnetically operated means to control the flow of the hydraulic operating fluid to and from the table locking means.

4. In a machine tool of the class described, the combination of a base; a table mounted for rotation on the base and having a plurality of sockets therein; a reversible rotary hydraulic motor; a driving connection between the motor and the table; a servo valve mechanism comprising a body having an inlet and two outlet openings, a sleeve having three ports respectively in communication with said openings at all times, a valve rotatable in the sleeve and having ports registerable with the ports in the sleeve, means to limit relative rotation of the valve and sleeve, resilient means biased to move the valve and sleeve relatively to bring their ports into registration, a latch holding the valve against rotation, a driving connection between the table and the sleeve; a source of hydraulic fluid under pressure connected to the inlet port of the servo valve body; conduits connecting the outlet ports of the servo valve body to the hydraulic motor; a shot bolt reciprocable in the base and engageable in the sockets in the table; hydraulic control means for actuating the shot bolt; and means controlled by the shot bolt to move said servo valve latch to its releasing position when the shot bolt has been disengaged from the table socket.

5. A servo valve for use in hydraulic control apparatus comprising, a body having an inlet port and two outlet ports formed therein, a sleeve mounted for rotation in the body and having annular external grooves for cooperation with said ports, said sleeve having openings communicating with the annular grooves, a valve rotatable within said sleeve and having holes cooperable with the openings in the sleeve, means for limiting the extent of relative rotation of the valve and sleeve, means for rotatably positioning the sleeve in response to the position of a part controlled by the servo valve, a torsion spring connected between the sleeve and the valve to rotate the valve relative to the sleeve in a direction to bring the holes in the valve into registry with the openings in the sleeve and thereby permit flow of hydraulic fluid from the inlet port to one of the outlet ports, a latch for holding said valve against rotation, and means for releasing said latch to permit the flow of hydraulic fluid through the servo valve in a direction to cause the part to be actuated to move in a direction to cause the sleeve to follow the movement of the valve.

6. In combination a servo valve comprising a body, a sleeve mounted for rotation in the body, a valve rotatable within the sleeve, means to limit the extent of relative rotation of the valve and the sleeve, a torsion spring operatively connected between the valve and the sleeve, a latch pawl carried by the valve body and movable relative thereto, a stop connected to the valve and engageable with the latch pawl to prevent the spring from rotating the valve, a hydraulic motor, a table driven thereby, gearing connecting the table and the servo valve sleeve to cause the sleeve to rotate through a predetermined angular distance upon movement of the table through an angle representing the angular distance through which the table is to be indexed upon each cycle of operation, and means forming part of the servo valve to control the supply of hydraulic operating fluid to the hydraulic motor upon relative angular displacement of the valve and the sleeve due to the operation of the torsion spring when the latch pawl is operated to release the valve.

7. In a machine tool having a rotary workpiece carrying table, the combination of a hydraulic motor connected to the table to rotate the latter, a servo valve for controlling the flow of hydraulic actuating fluid to the motor, and a follow-up kinematic train between the work table and the servo valve to cause the latter gradually to reduce the rate of flow of the hydraulic fluid to the motor as the table approaches an index position at which it is to be stopped, whereby the table and parts carried thereby will come to rest at the index position without appreciable shock.

8. In a machine tool having a rotary indexing table adapted to carry parts to be positioned in two or more index positions, the combination of a source of hydraulic fluid under pressure, a hydraulic motor connected to the table to drive the latter, a two-part servo valve supplied with hydraulic pressure fluid from the source and controlling the flow thereof to the hydraulic motor, resilient means for relatively moving the two parts of the servo valve mechanism, a positive kinematic driving connection between the table and one of the servo valve parts, a stop to hold the other servo valve part against relative rotation by the spring, means to move said stop from the position in which it prevents relative movement of the two servo valve parts, and means to reset said stop after the servo valve part has been released, said servo valve operating to supply hydraulic actuating fluid to the motor at a relatively rapid flow rate when the stop is removed from arresting position and gradually to reduce the flow rate as the servo valve part driven by the table approaches the position it assumes relative to the other servo valve part when the flow to the hydraulic motor is cut off.

9. In a machine tool having a rotary table, means to index said table through predetermined angular distances to cause it to move successively to a plurality of index stations, said means comprising a hydraulic motor, driving means connecting the motor and the table, said driving means including a yieldable connection, a hydraulic valve mechanism operable to control the flow of a hydraulic pressure fluid to the hydraulic motor, means rapidly to open said valve, and means driven from the work table to close said valve gradually as the work table approaches its index station.

10. The combination set forth in claim 9, in which the hydraulic valve mechanism is constructed and arranged to cause the hydraulic motor slowly to reverse the direction of rotation of the work table if it overtravels past its index station.

11. In an apparatus for indexing the work table of a machine tool, the combination of a reversible hydraulic motor connected to rotate the table in either direction, a two-part hydraulic follow-up servo valve controlling the supply of hydraulic actuating fluid to the hydraulic motor, a driving connection between the table and one part of the valve, and means to move the other part of the valve to a predetermined position, thereby to condition the valve to cause the motor to move the table and the other valve part predetermined distances before the valve cuts off the supply of hydraulic fluid to the motor.

12. In a machine tool having a rotary workpiece carrying table, means to index said table successively to a plurality of index stations comprising, a source of hydraulic fluid under pressure, a reversible hydraulic motor, a resilient lost motion driving connection between the hydraulic motor and the table, a two-part servo valve connected to the motor to control its speed and direction of operation, a shot bolt cooperable with the table to lock the table at any index station, a hydraulic piston and cylinder for operating the shot bolt, resilient means connected to one of the servo valve parts and operable to move to a position in which the hydraulic pressure fluid may flow to the motor, a driving train connecting the other servo valve part to the table to cause such part to move in synchronism with the table, a stop to prevent the resilient means from moving its connected servo valve part, a hydraulic actuator operable when supplied with hydraulic fluid under pressure to render said stop ineffective, a transfer valve operatively connected to the shot bolt and effective to connect the source to the hydraulic actuator when the shot bolt is in locking engagement with the table and effective to connect the source with the servo valve and to relieve the pressure in the hydraulic actuator when the shot bolt is disengaged from the table, a two-position control valve connected between the source and the opposite ends of the shot bolt cylinder to determine the position to be assumed by the latter, a pair of solenoids connected to the two-position valve and respectively operable when energized to move the latter between its two operative positions, and electrical control circuits for selectively energizing the solenoids.

13. In a machine tool having a rotary workpiece carrying table, means to index said table successively to a plurality of index stations comprising, a source of hydraulic fluid under pressure, a reversible hydraulic motor, a driving connection between the hydraulic motor and the table, a two-part servo valve connected to the motor to control its speed and direction of operation, a shot bolt cooperable with the table to lock the table at any index station, a hydraulic piston and cylinder for operating the shot bolt, yielding means connected to one of the servo valve parts and operable to move it to a position in which the hydraulic pressure fluid may flow to the motor, means to cause the other servo valve part to move in synchronism with the table, holding means to prevent the yielding means from moving its connected servo valve part, an actuator operable when supplied with hydraulic fluid under pressure to render said holding ineffective, and a transfer valve operatively connected to the shot bolt and effective to connect the source to the actuator when the shot bolt is in locking engagement with the table and effective to connect the source with the servo valve and to relieve the pressure in the actuator when the shot bolt is disengaged from the table.

14. In a machine tool having a rotary workpiece carrying table, means to index said table successively to a plurality of index stations comprising, a source of hydraulic fluid under pressure, a reversible hydraulic motor, a resilient lost motion driving connection between the hydraulic motor and the table, a two-part servo valve connected to the motor to control its speed and direction of operation, said servo valve being constructed greatly to reduce the rate of flow therethrough as it approaches closed position, a shot bolt cooperable with the table to lock the table at any index station, a hydraulic piston and cylinder for operating the shot bolt, resilient means connected to one of the servo valve parts and operable to move to a position in which the hydraulic pressure fluid may flow to the motor, a driving train connecting the other servo valve part to the table to cause such part to move in synchronism with the table, a stop to prevent the resilient means from moving its connected servo valve part, a hydraulic actuator operable when supplied with hydraulic fluid under pressure to render said stop ineffective, and a transfer valve operatively connected to the shot bolt and effective to connect the source to the hydraulic actuator when the shot bolt is in locking engagement with the table and effective to connect the source with the servo valve and to relieve the pressure in the hydraulic actuator when the shot bolt is disengaged from the table.

15. In a machine tool having a rotary workpiece carrying table, means to index said table sucessively to a plurality of index stations comprising, a source of hydraulic fluid under pressure, a reversible hydraulic motor, a resilient lost motion driving connection between the hydraulic motor and the table, a two-part servo valve connected to the motor to control its speed and direction of operation, a shot bolt cooperable with the table to lock the table at any index station, a hydraulic piston and cylinder for operating the shot bolt, resilient means connected to one of the servo valve parts and operable to move to a position in which the hydraulic pressure fluid may flow to the motor, a driving train connecting the other servo valve part to the table to cause such part to move in synchronism with the table, a stop to prevent the resilient means from moving its connected servo valve part, a hydraulic actuator operable when supplied with hydraulic fluid under pressure to render said stop ineffective, a transfer valve operatively connected to the shot bolt and effective to connect the source to the hydraulic actuator when the shot bolt is in locking engagement with the table and effective to connect the source with the servo valve and to relieve the pressure in the hydraulic actuator when the shot bolt is disengaged from the table, a two-position control valve connected between the source and the opposite ends of the shot bolt cylinder to determine the position to be assumed by the latter, electromagnetic means connected to the two-position valve and operable to move the latter between its two operative positions, and electrical control circuits for selectively energizing the electromagnetic means.

ROBERT A. SCHAFER.
RALPH B. RODAL.

REFERENCES CITED

The following references are of record in the file of this patent:

UNITED STATES PATENTS

| Number | Name | Date |
|---|---|---|
| 1,854,941 | Kiel | Apr. 19, 1932 |
| 1,924,594 | Blood et al. | Aug. 29, 1933 |
| 2,144,322 | Benson | Jan. 17, 1939 |
| 2,311,987 | Jackson | Feb. 23, 1943 |
| 2,380,873 | Schaefer et al. | July 31, 1945 |